Dec. 7, 1926.
R. SELIGMAN
1,609,971
HEAT INTERCHANGE APPARATUS
Filed July 15, 1924     2 Sheets-Sheet 1
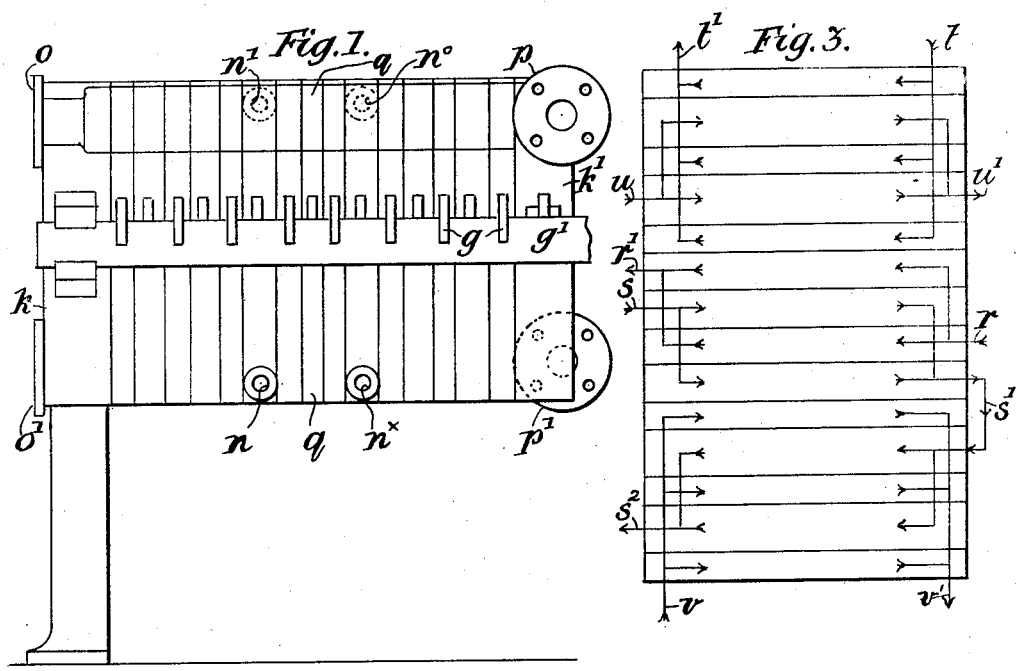
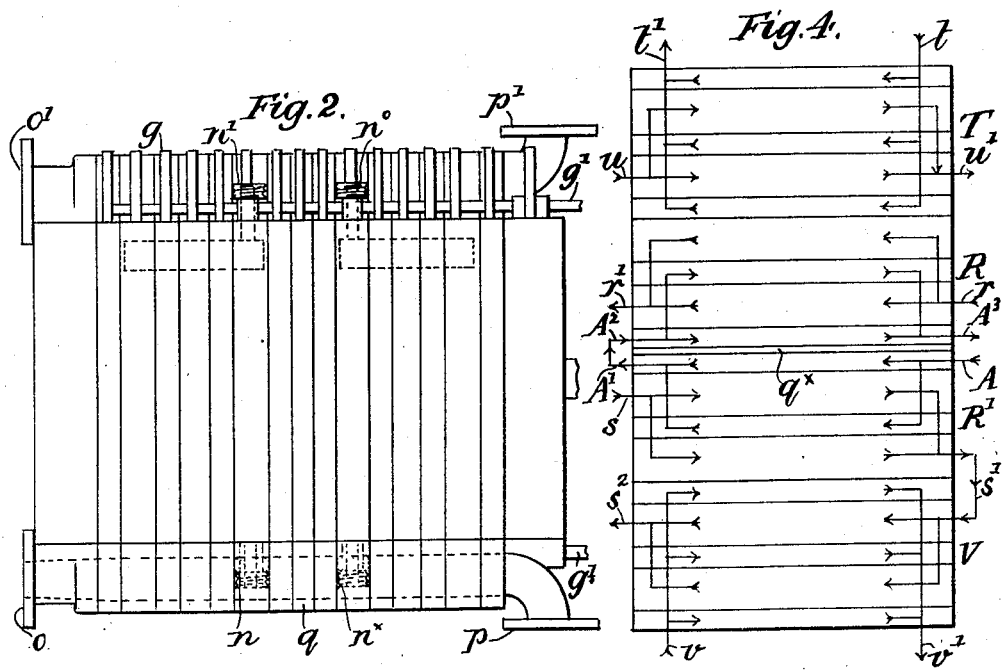
Inventor
Richard Seligman
by
Stockbridge & Borst
Attys

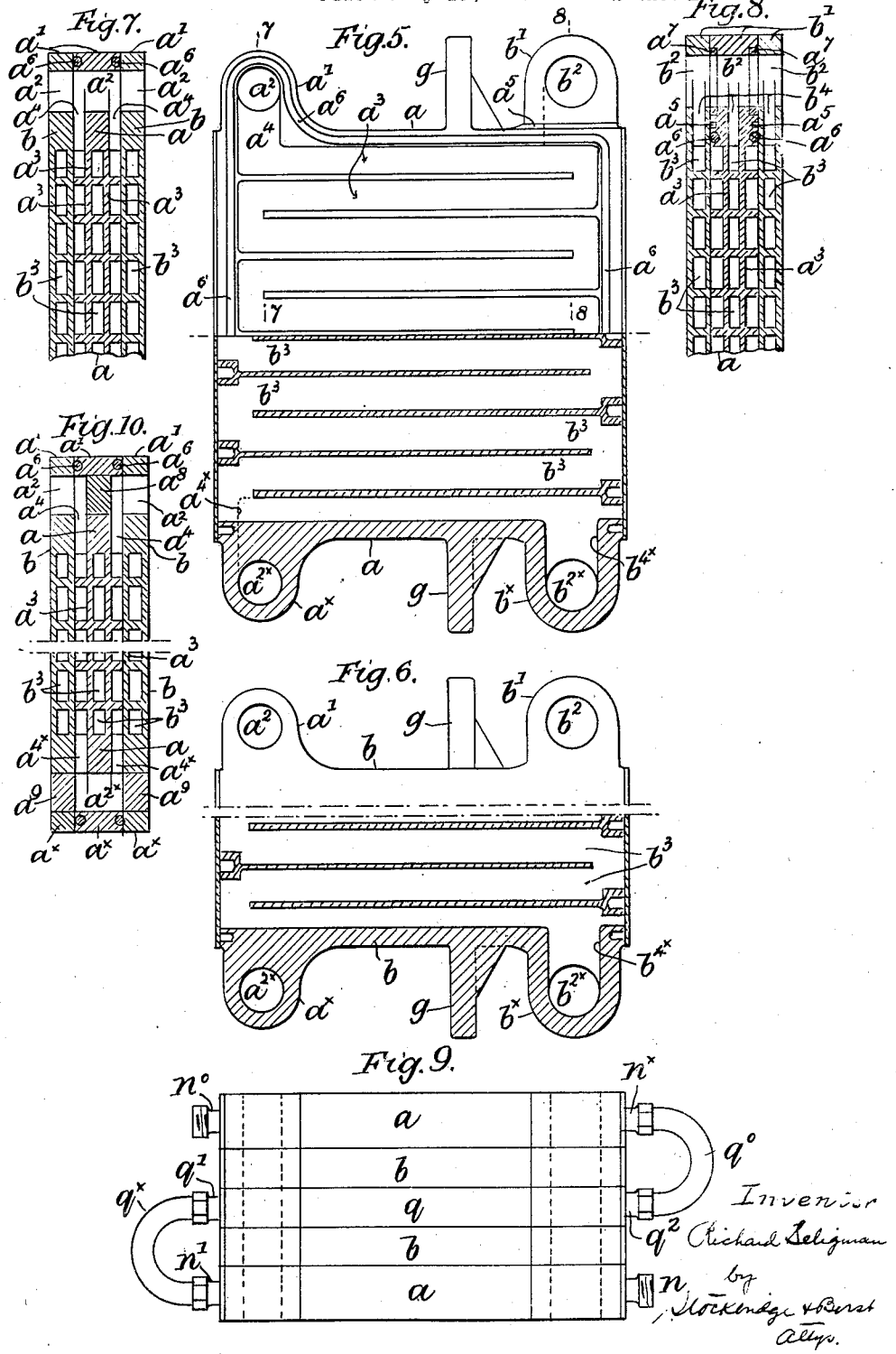

Patented Dec. 7, 1926.

1,609,971

UNITED STATES PATENT OFFICE.

RICHARD SELIGMAN, OF WIMBLEDON, ENGLAND, ASSIGNOR TO ALUMINIUM PLANT AND VESSEL COMPANY LIMITED, OF LONDON, ENGLAND.

HEAT-INTERCHANGE APPARATUS.

Application filed July 15, 1924, Serial No. 726,083, and in Great Britain July 18, 1923.

This invention has reference to the interchange of heat by means of machinery or apparatus of the kind in which channels or passages for the liquids are constituted by plates provided with facial grooves or ribs which are adapted to furnish a zig-zag course for the liquids and relates to an improved construction or arrangement whereby the machine is rendered capable of conducting more than one operation, the plural operations being carried on simultaneously or successively and continuously.

The improved apparatus is particularly suitable for employment in heating and/or cooling liquids such as milk, beer or the like in connection with which it is necessary or desirable that a state of rigid separation be preserved during the treatment and in the specification accompanying a patent application Serial No. 726,084, filed July 15, 1924, concurrently herewith I have described the forms of plates and methods of jointing which are found to give the best results in practice.

The liquids are admitted to and passed through a series of such plates either by way of passages arranged within or without the plates or some within and some without and disposed either within or without the main joint between the plates and provided or not with a secondary or sealing joint.

For effecting the operations of heating and cooling or heating or cooling in stages or regeneratively the apparatus is constituted by a number of the plates above referred to so arranged that milk, for example, is heated in one portion and cooled in the other portion thereof. The heating and cooling may be conducted simultaneously, the cooling of the pre-heated milk taking place while the cold milk is being heated. The milk from the heating portion may be conducted directly to the cooling portion or it may be passed to some other device or machine for intermediate treatment, such as filtration. There may be provision for filtering in the same apparatus, a dividing plate being adapted to serve the purpose.

According to a modified arrangement the apparatus may comprise three main sections, a regenerative section being disposed between a cooling and a heating section. In such a machine cold milk for example, may be supplied to the regenerative section where it is pre-heated by hot milk arriving from the heating section or a hot milk holder and the pre-heated milk passed out to a filter if desired, it being re-admitted for the purpose of receiving heat from a medium, such as hot water, steam or the like, which is caused to pass through adjacent plates in the part of the apparatus to which the aforesaid pre-heated milk is re-admitted; the said milk passing out as hot milk to be conducted to a suitable holder; such interchange is effected by direct regeneration. The milk may also be passed from one section to another without leaving the machine.

If it be desired to effect the interchange by indirect regeneration, the apparatus may comprise four main sections—a cooling and a heating section with two regenerative sections sandwiched between them—and the fluid used to cool the hot milk may be employed in heating the cold milk.

The plates employed in the apparatus may conveniently be of the kind referred to in my aforesaid concurrently filed specification as double plates and water plates, but any of the plates described may be used whether the purpose be heating, cooling or regenerating.

In order that the invention may be readily understood and carried into effect same will now be more fully described with reference to the accompanying drawings, in which:—

Figures 1 and 2 are respectively a side view and a plan illustrating an arrangement of apparatus according to this invention adapted to serve a dual purpose, for example, a combined heating and cooling; the connections being effected at the ends of and through the plates. The arrangement is adapted for use where it is desired to heat or, alternatively, to cool in two stages.

Figures 3 and 4 are diagrammatic views illustrating a mode of working regeneratively. The apparatus indicated in Figure 3 embodies three sections—a regenerative section disposed between a heating section and a cooling section. The arrangement is adapted for use in the application of direct regeneration between the liquids to be heated and cooled. Figure 4 shows a modified arrangement adapted for use in the application of indirect regeneration in which case the medium for cooling the hot liquid in one of the regenerative sections is used in pre-heating the liquid to be heated in the other regenerative section. The apparatus as indicated embodies four main sections—two regenerative sections arranged between a heating and a cooling section—but the arrangement and number thereof may be varied according to requirements.

Figure 5 is a part elevation and section of a combined or double form of plate applicable for use in carrying out the present invention; the upper half of the figure showing the channels formed on the exterior of the plate and one of the admission or exhaust passages pertaining thereto and the lower half the interiorly formed channels and one of the admission or exhaust passages pertaining thereto.

Figure 6 is a view similar to Figure 5 showing a plate having interiorly formed channels only the exterior faces of the plate being plane surfaces; the upper half of the figure shows the plane or flat exterior surface of the plate and the lower half the interiorly formed channels and one of the admission or exhaust passages pertaining thereto.

Figure 7 is a transverse section taken on the line 7—7 in Figure 5.

Figure 8 is a transverse section taken on the line 8—8 in Figure 5.

Figure 9 is a fractional view illustrating a means of employing a dividing plate and passing liquid from one section to another of the apparatus without leaving the same.

Figure 10 is a view similar to Figure 7 illustrating a means of causing liquid to pass from one section, say a cooling section, to another section, say a heating section without issuing from the machine, or from one plate to another in series within the same section.

Referring to Figures 1 and 2 in which the arrangement admits of heating and cooling being carried on simultaneously, milk, for example, may be heated in the left-hand portion of the machine and cooled in the right-hand portion. $n$ indicates the inlet for cold milk and $n^1$ the outlet for hot or heated milk; $o$ being the inlet for hot water and $o^1$ the outlet therefor. Hot milk admitted at $n^x$ would pass out at $n^0$ as cold or cooled milk; cold water or brine being admitted at $p$ and passed out at $p^1$.

This arrangement of the machine is adapted for employment in cases when it is desired to heat or alternatively to cool in two stages. In so using the apparatus for heating, say, milk, the cold milk would be admitted at $n^x$ and issue as partially heated milk at $n^0$; the pre-heating medium entering the apparatus at $p$ and passing out at $p^1$. The partially heated milk issuing from $n^0$ may be passed directly to $n^1$ or to some other machine for intermediate treatment such as filtration, in which latter case it would be brought thence to $n^1$ where it is admitted to the apparatus for the purpose of receiving final heating; the fluid used in this connection preferably entering the machine at $o^1$ and issuing at $o$.

By using a dividing plate, as indicated at $q$, and shown in detail in Figure 9, which may be adapted to serve as a filtering medium the liquid may be retained in the machine until final heating thereof is accomplished; the partially or pre-heated milk being conducted through the dividing plate or filter direct to the final heating portion of the machine.

Obviously the entrance and exit of the liquids may in all cases be reversed if so desired; the pre-heated liquid, for example, can be caused to issue at $n^0$ and re-enter at $n$, the pre-heating and final heating media being subject to similar variation.

The arrangement and assemblage of the plates in installing a complete apparatus and the manner of passing the liquids into and through the machine will be readily understood from an inspection of Figures 5, 6, 7 and 8 which illustrate a method of working in parallel.

In these figures, the combined or double plate is indicated by the reference letter $a$ and the plates with interiorly formed channels only by the reference letter $b$.

Two extensions or lugs $a^1$ $a^x$ are formed on opposite sides of each plate $a$, $b$, each having a transverse passage or bore indicated at $a^2$, $a^{2x}$, respectively, in communication with the channels or passages $a^3$ in each face of the plate $a$ by way of openings $a^4$, $a^{4x}$. Thus milk, for instance, admitted to the bore or passage $a^2$ finds ingress through the opening $a^4$ to the channels or passages $a^3$ and after traversing the said channels finds egress from the latter by way of the corresponding openings $a^{4x}$ to the passage $a^{2x}$ in the lug or extension $a^x$ at the opposite side of the plate.

Two extensions or lugs $b^1$, $b^x$ are also formed on opposite sides of each plate $a$, $b$, each having a transverse through-way or bore indicated at $b^2$, $b^{2x}$ respectively, in communication with the interiorly formed channels or passages $b^3$ by way of openings $b^4$, $b^{4x}$ respectively, so that water, for example, admitted to the transverse through-way $b^2$ in the lug or extension $b^1$ passes through the opening $b^4$ to the channels or passages $b^3$ escaping from the latter by way of corresponding openings $b^{4x}$ into the transverse passage $b^{2x}$ in the lug or extension $b^x$ at the opposite side of the plate.

When a number of the plates $a$, $b$, are assembled to constitute a complete machine or apparatus according to this invention, it will be seen that the through-ways, $a^2$, $a^{2x}$ and $b^2$, $b^{2x}$ in the respective lugs $a^1$, $a^x$ and $b^1$, $b^x$ are open to their respective channels or passages $a^3$ and $b^3$ but are closed as regards intercommunication so that, assuming milk is being treated, that liquid will be confined to the channels $a^3$ while the water will be similarly confined to the channels $b^3$ owing to the through-ways $b^2$, $b^{2x}$ being open to the channels or passages $b^3$ but closed to the channels $a^3$.

Although only three plates appear in the assembly illustrated, it is to be understood that as working installation according to the invention may comprise any required number of the plates $a$ and $b$ such plates being arranged in alternating order or relation. The plates $b$ conveniently terminate a series as they effect the closing of the facial channels on the plates $a$.

The lugs $a^1$, $a^x$ and $b^1$, $b^x$ on one plate serve as distance pieces or communicating channels to the similar lugs on other or adjacent plates.

By means of a groove indicated at $a^5$ any liquid that may leak past the joints $a^6$ and $a^7$ is allowed to escape.

The plates are formed or provided with supporting lugs $g$, whereby they are carried on bars or rests $g^1$ $g^1$. Figures 1 and 2, the assemblage being clamped between end plates or covers $k$ $k^1$ by means of a screw or other suitable device, not shown.

A means of utilizing the dividing plate $q$ as a filter is illustrated in Figure 9, in which it will be seen that the outlet $n^1$ is connected with an inlet $q^1$ by way of an elbow or bent piece $q^x$ so that liquid may pass from the plate $a$ to the said dividing plate $q$ and after passing through the latter be admitted to another plate $a$, on the other side of the dividing plate, by way of the outlet $q^2$ elbow or bent piece $q^0$ and inlet $n^x$.

Thus more than one operation may be conducted in the same apparatus.

Referring now to the combination and arrangement illustrated diagrammatically in Figure 3 the device comprises three main sections a regenerative section being disposed between a cooling and a heating section. In this arrangement, cold milk, for example, to be heated is admitted to the regenerative section at $r$ wherein it is preheated by hot milk which is admitted at $s$ from a hot milk holder (not shown), the pre-heated milk passing out at $r^1$ to a filter, if desired, or either filtered or not into the heating section at $u$ into which section hot water is admitted at $t$ and passed out at $t^1$ the pre-heated milk which has undergone the interchange of heat from the hot water passing out of the apparatus as hot milk at $u^1$ whence it may be conducted to a suitable holder (not shown). Hot milk by entering at $s$ passes as partly cooled milk by way of $s^1$ into the cooling section issuing from the latter by way of $s^2$ as fully cooled milk as the result of brine or other cooling medium being admitted to the said cooling section at $v$ and passed out at $v^1$.

It will thus be seen that cold milk entering the regenerative section becomes preheated by hot milk derived from a milk holder and that after leaving the regenerative section in a partly heated condition it either issues to be filtered or otherwise treated or it may be filtered in the machine by providing the machine with a plate $q$ as described above or it may be conducted directly into the heating section. On entering this latter section the partly heated milk is brought to the desired temperature degree by the hot water. The hot milk from a holder similarly enters the regenerative section wherein it is partly cooled by the before mentioned cold milk and passes thence to the cooling section where it is finally cooled by the brine or other cooling medium.

The direction of flow of the respective liquids is indicated by arrow heads and will be readily followed from the drawing.

In cases where intermediate treatment is not resorted to or necessary between the various stages of heating or cooling, the milk may be conducted from one section to another through suitable ports without issuing from the machine and the arrangement be such that the milk can enter the following section in the reverse way to that indicated in the diagram.

The arrangement of apparatus just described is applicable for employment in a system involving direct regeneration between hot and cold liquids and the machine may be composed of a number of plates, such as illustrated in Figures 1 and 2 of my concurrently filed application hereinbefore referred to, and suitably connecting the respective sections.

It is frequently however a matter of convenience to employ a system of indirect regeneration in which the fluid used to cool the hot milk, for example, is used to heat the cold milk.

Such a system of indirect regeneration is illustrated diagrammatically in Figure 4 and a machine for working according to this method is composed of a number of the combined or double and water plates shown in Figures 5 to 8 inclusive. The device comprises four main sections, viz: two regenerative sections R R$^1$ disposed between a heating section T and a cooling section V. The regenerative sections may be separated by inserting a plate $q^x$ of insulating material between them.

Assuming cold milk is to be heated it is caused to enter the regenerative section R at $r$ wherein it is subjected to a partial heating by hot water which passes thereto from the other regenerative section R$^1$. This hot water is supplied to the section R$^1$ at A and issues therefrom at A$^1$ the said water entering pre-heating section R at A² and issuing therefrom at A³. The preheated milk issues at r¹. Hot water is admitted at t to the heating section T and passed out at t¹. The pre-heated and, if desired, filtered milk passes into the heating section T of the apparatus at u and issues therefrom at u¹ as hot milk whence it may be conducted to a suitable holder (not shown).

Into the regenerative section R¹ hot milk is admitted at s and on issuing therefrom is passed by way of the conduits s¹ into the cooling section V whence it issues as fully cooled milk at S². The cooling medium or water which enters the said section R¹ at A and leaves the same at A¹ after partially cooling the hot milk which is admitted to the said section at S is utilized as the pre-heating medium for the cold milk admitting to the regenerative section R as above described.

Alternatively the hot milk may be passed by a suitable arrangement of ports from the regenerative section R¹ to the regenerative section R without leaving the apparatus.

Brine or other cooling medium is admitted to the cooling section V so that same, enters the said section at v and leaves it at v¹.

The before mentioned dividing plate may be inserted between the regenerative sections R and R¹ as indicated by the reference $q^x$.

Although in the above described embodiment of the invention the liquids or fluids have generally been referred to as passing through the machine in parallel it will be readily apparent that by blocking the suitable ports the liquids or fluids may be conducted through the machine in series and that if the plugs used to block the ports be made removable or interchangeable the direction of flow of either liquid may be changed so that the machine may be adapted to serve for heating by parallel flow and cooling by series flow in quick succession.

The situation of the plugs in Figure 10 is such that the milk flows in series while the flow of the heating or cooling medium is assumed to be in parallel—compare Figure 8.

Referring to Figure 10, the bore or passage $a^2$ in the upper side of the plate $a$ is filled with a solid plug $a^8$ while the bore or passage $a^{2x}$ in the lower side of each adjacent plate $b$ is similarly filled with a solid plug $a^9$.

If it be assumed that milk, for example, is introduced into the bore $a^2$ on the right hand side of the figure the flow thereof will be deflected by the plug $a^8$ so that it will pass through the opening $a^4$ on that side of the plug into the channels $a^3$ in the plane thereof and when the milk has traversed the said channels it passes into the bore $a^{2x}$ at the lower end of the plate $a$ and re-traverses the said plate by way of the channels $a^3$ on the left hand side of the figure finding egress at the upper end of the plate $a$ through the opening $a^4$ into the bore or passage $a^2$ on the left hand side of the plug $a^8$, the plugs $a^9$ $a^9$ confining the milk to the channels and passages in the plate $a$.

Such an arrangement as last described may be adopted where it is desired to pass milk from one section to another within the apparatus and, for the purpose of explanation, it can be assumed that the channels $b^3$ on the right hand side of the figure (10) are being supplied with heating water and the channels $b^3$ on the left hand side of the figure with cooling water, while milk is being passed through the channels $a^3$ on the right hand side and from those channels to the channels $a^3$ on the left hand side. The milk is thus heated on the right hand side and cooled on the left hand side. By inserting plugs similar at $a^8$ in the bores $b^2$ or $b^{2x}$ of plate $a$ intermingling of the heating and cooling media is prevented.

I claim:—

1. A heat interchange apparatus which is adapted for conducting the operations of heating and cooling simultaneously or successively and continuously and in stages or regeneratively while maintaining the liquids in a state of rigid separation comprising series of plates forming zig-zag channels for the liquids, each series being composed of grooved plates and plates having plane surfaces which contact with and side close the grooves, means in the plate structure for conveying liquids to the several plate series, means also in the plate structure for passing the liquids from one plate to another in the series, means for dividing the series and means for conducting the liquids from one series to another.

2. A heat interchange apparatus which is adapted for conducting the operations of heating and cooling simultaneously or successively and continuously and in stages or regeneratively while maintaining the liquids in a state of rigid separation comprising series of plates forming zig-zag channels for the fluids each series being composed of plates having facially and interiorly formed zig-zag channels and plates having only interiorly formed zig-zag channels and plane outer faces which contact with and side close the said facially formed channels, means in the plate structure for conveying fluids to the several plate series, means also in the plate structure for passing the fluids from one plate to another in the series, means for dividing the series and means for conducting the fluids from one series to another.

3. A heat interchange apparatus which is adapted for conducting the operations of heating and cooling simultaneously or successively and continuously and in stages or regeneratively while maintaining the liquids in a state of rigid separation comprising series of plates composed of facially grooved plates and plates having plane surfaces which contact with and side close the said grooves to form zig-zag channels for the passage of liquids, transversely holed lug extensions on all the plates which on alignment as the result of assembling a number of the said plates form passages for the fluids, communicating ports between the said passages and the aforesaid zig-zag channels, means in the plate structure for passing the fluids from one plate to another in the series, means for dividing the series and means for conducting the fluids from one series to another.

4. A heat interchange apparatus which is adapted for conducting the operations of heating and cooling simultaneously or successively and continuously and in stages or regeneratively while maintaining the liquids in a state of rigid separation comprising series of plates forming zig-zag channels for the fluids each series being composed of plates having facially and interiorly formed zig-zag channels and plates having only interiorly formed zig-zag channels and plane outer faces which contact with and side close the said facially formed channels, transversely holed lug extensions on all the plates which on alignment as the result of assembling a number of the said plates form passages for the fluids and communicating ports between the said passages and the aforesaid zig-zag channels.

5. A heat interchange apparatus which is adapted for conducting the operations of heating and cooling simultaneously or successively and continuously and in stages or regeneratively while maintaining the liquids in a state of rigid separation comprising series of plates adapted to form zig-zag channels for the fluids each series being composed of grooved plates and plates having plane surfaces which contact with and side close the grooves, transversely holed lug extensions on all the plates which on alignment as the result of assembling a number of the said plates form passages for the fluids, communicating ports between the respective passages and the zig-zag channels and a plate dividing the several series.

6. A heat interchange apparatus which is adapted for conducting the operations of heating and cooling simultaneously or successively and continuously and in stages or regeneratively while maintaining the liquids in a state of rigid separation comprising series of plates forming zig-zag channels for the fluids each series being composed of plates having facially and interiorly formed zig-zag channels and plates having only interiorly formed zig-zag channels and plane outer faces which contact with and side close the said facially formed channels, transversely holed lug extensions on all the plates which on alignment as the result of assembling a number of the said plates form passages for the fluids, communicating ports between the respective passages and the zig-zag channels and a plate dividing the several series.

7. A heat interchange apparatus which comprises series of plates each series being composed of plates whereof some have facially and interiorly formed channels and others have only interiorly formed channels, holed lug extensions on all the plates, which are adapted on assembling a number of the said plates in alternating relation to provide transverse passages for the fluids, communicating ports between the said passages and the respective channels and a dividing plate between the plate series adapted to conduct fluid from one plate series to another.

8. A heat interchange apparatus which is adapted for conducting the operations of heating and cooling simultaneously or successively and continuously and in stages or regeneratively while maintaining the liquids in a state of rigid separation comprised of series of plates forming zig-zag channels for the fluids each series being composed of grooved plates and plates having plane surfaces which contact with and side close the grooves, transversely holed by extensions on all the plates which on alignment as the result of assembling a number of the said plates form passages for the fluids, communicating ports between the respective passages and the zig-zag channels, means for sealing the joints between adjacent and abutting faces of the assembled plates and a dividing plate between the several plate series.

9. A heat interchange apparatus which is adapted for conducting the operations of heating and cooling simultaneously or successively and continuously and in stages or regeneratively while maintaining the liquids in a state of rigid separation comprised of series of plates forming zig-zag channels for the fluids each series being composed of plates having facially and interiorly formed zig-zag channels and plates having only interiorly formed zig-zag channels and plane outer faces which contact with and side close the said facially formed channels, transversely holed lug extensions on all the plates which on alignment as the result of assembling a number of the said plates form passages for the fluids, communicating ports between the respective passages and the zig-zag channels, means for sealing the joints between adjacent and abutting faces of the assembled plates and a dividing plate between the several plate series.

10. A heat interchange apparatus which comprises a stationary cover, a movable cover, series of plates supported between the said covers composed of alternating facially and interiorly channelled plates and plates with only interiorly formed channels, a dividing plate between the several plate series, holed lug extensions on all the plates to provide passages for the fluids, means for sealing the joints between the abutting faces of the plates, communicating ports between the said passages and channels and removable plugs in said passages for controlling the passage of the fluids.

11. A heat interchange apparatus which comprises series of plates channelled to form zig-zag passages for fluids, means in the plate structure for conveying fluids to the several plate series, means also in the plate structure for passing the fluids from one plate to another in the series, means for dividing the series, means for conducting fluids from one series to another and removable plugs arranged relatively to the said passages for directing the said fluids.

In witness whereof I have hereunto subscribed my signature.

RICHARD SELIGMAN.